United States Patent [19]

Maszalec

[11] Patent Number: 4,500,353
[45] Date of Patent: Feb. 19, 1985

[54] ELASTOMERIC COMPRESSIBLE MIXTURE

[76] Inventor: Judith A. Maszalec, 464 Riverside Ave., Rutherford, N.J. 07070

[21] Appl. No.: 569,523

[22] Filed: Jan. 9, 1984

[51] Int. Cl.³ .............................................. B22F 1/00
[52] U.S. Cl. ..................................................... 75/252
[58] Field of Search ........................................ 75/252

[56] References Cited

U.S. PATENT DOCUMENTS 3,723,165  3/1973  Longo et al. .......................... 75/252
4,000,982  1/1977  Ueda ..................................... 75/252

*Primary Examiner*—W. Stallard
*Attorney, Agent, or Firm*—Ralph R. Roberts

[57] ABSTRACT

This invention provides an elastomeric compressible mixture having the compressible properties of a rubber or rubber-like mixture with the heat characteristics of a conductive metal member. This compound material is made of two part polymerized tetrafluoro ethylene powder and the remainder about seventy five parts aluminum powder and twenty five parts silicone rubber. This mixture is attached as a flat sheet to a conductive metal backup member or may be a cover for a conductive metal roll. This mixture is used to accommodate irregular thicknesses of thermoplastic films. This mixture of material is used with heat and pressure to effect a seal of the heated thermoplastic film to an adjacent film.

5 Claims, 2 Drawing Figures

ELASTOMERIC COMPRESSIBLE MIXTURE

BACKGROUND OF THE INVENTION

1. Field of the Invention

With reference to the classification of art as established in and by the U.S. Patent Office this invention is believed to be found in the chemical art of mixed components and particularly for mixtures of elastomeric base material mixed with metal powder and a release plastic.

2. Description of the Prior Art

The use of rubber and rubber-like materials as a resilient covering for rolls or sheets is well known. The particular mixtures such as rubber or rubber-like materials have been used for resilient facing for and against rolls or opposite cutting knives. This rubber or rubber-like material is usually a mid-durometer range but may be as stiff as that used for tire tread mixtures. The stiffening of rubber or rubber-like material is usually with a mixing with clays or similar material which adds a body or filler to the initial resiliency of the product. Rubber or rubber-like mixtures are well known as being non-conductors (heat barriers) of heat and provide insulation-like properties. These properties are not desirable for adhering together of partially melted or heat softened plastic material such as films used as plies of material.

In as far as is known a formulated mixture of material utilizing a rubber-like component, aluminum and a small additional component of polymerized tetrafluoro ethylene powder is not known. This mixture provides not only elastomeric properties but thermoconductivity and the Teflon powder which is a small (2%) portion of the mixture provides the desired release properties.

SUMMARY OF THE INVENTION

This invention may be summarized, at least in part, with reference to its object. It is an object of this invention to provide, and it does provide, an elastomeric mixture in which aluminum powder is a major ingredient, rubber or rubber-like material is a minor ingredient and polymerized tetracluoro ethylene powder is also an additive to provide release properties to the compound. The thermoconductivity is provided by the presence of aluminum powder in the mixture. Release as a property is provided by Teflon powder.

As a covering of a roll or as a sheet product this elastomeric mixture is used in a thickness of not less than one-sixteenth of an inch (1/16") and not greater than one-half inch (½"). As reduced to practice it has been found desirable that the elastomeric mixture be about one-eighth of an inch in thickness (⅛"). As an applied covering this mixture provides a resiliency and thermoconductivity for heat sealing or welding of even or uneven thermoplastic films to themselves. This elastomeric mixture is compressible and causes the engaged films in the thicker areas to be pressed together to provide a continuous seal or weld of both thick and thin areas of heat softened plastic films. This elastomeric mixture is used with heat and pressure for any unevenness of the plastic film thicknesses and to provide a heat transfer and pressure to the heated uniform and positive seal of two thin film layers together.

In addition to the above summary the following disclosure is detailed to insure adequacy and aid in understanding of the invention. This disclosure, however, is not intended to be disguised by variations in form or additions. For this reason there has been chosen a specific embodiment of the composition of material as first contacting layer for heated films and showing a preferred mixture for the elastomeric compressible mixture. This specific embodiment has been chosen for the purpose of illustration and description as shown in the accompanying drawing wherein:

Figure 1:
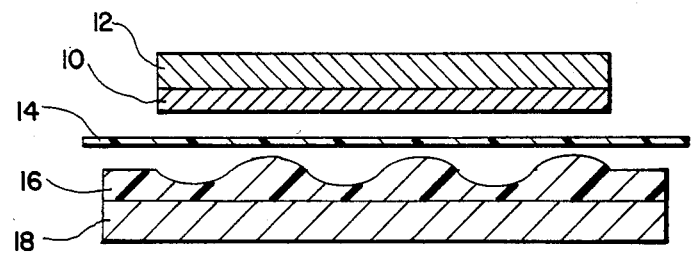
FIG. 1 represents a diagrammatic sectional side view showing an elastomeric compressible material secured to a solid aluminum backup plate which is moved to retain and seal two or more plies of heated film or one ply of flat film to and uneven plastic material layer for the purpose of sealing these films.

The one sheet of drawings accompanying, and forming a part of, this specification discloses details of use for the purpose of explanation but details may be modified without departure from the concept and principles of the invention and the invention may be incorporated in other forms than shown.

DETAILED DESCRIPTION OF THE DRAWING

Figure 2:
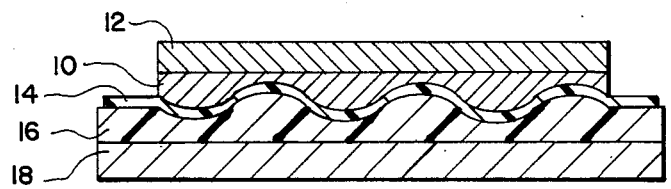
FIG. 2 represents a diagrammatic sectional side view of the apparatus of FIG. 1 with the flexible elastomeric compressible metallic material pressing a thermoplastic film against another film layer to form a hermetic, uniform, positive seal.

In FIGS. 1 and 2 it is to be noted that the elastomeric mixture material is identified as 10 and is secured to or fixed to a solid backup plate, preferably aluminum, and identified as 12. A flat or nearly flat film 14 is a thermoplastic film having characteristics that allow a continuous seal or weld to be made at those areas where and when the film is heated to a softened condition. An adjacent film is identified as 16 and may be uneven or even in thickness and may be one or two plies with the layer 16 supported by a backup 18. Under heat and pressure the elastomeric metal layer 10 compresses and compensates for any unevenness of the plastic plies so that heat transfer is present and is similar to conventional metal components in other apparatus. The compressible metallic containing mixture is not only accommodating of irregularities but the metallic portion provides heat tranfer to provide sealing of the interface of the film 14 and film 16. It is to be noted that the film or layer 16 is shown as having an uneven thickness. This illustration is exaggerated for the purpose of illustration. Often the unevenness is in the surface of the cooperating member 18 which may itself be irregular or may be slightly skewed. Whatever the cause the elastomeric metal member 10 is sufficiently resilient to accommodate the deformation encountered. This elastomeric is particularly useful where and when cavities and/or embossures are made in a cooperating metal plate or roll at 18.

In FIG. 2 the application of heat and pressure to the members of FIG. 1 is depicted. The flat film 14 has been sufficiently moved to accommodate the unevenness of the flexible film material layer 16 of FIG. 1. Pressure is applied so that the heated surfaces of the thermoplastic film materials 14 and 16 are brought into hermetic sealing condition. The heat through material 10 and backup 18 is sufficient to accomodate and provide sealing or welding of the contiguous films.

In FIGS. 1 and 2 the backup plate 12 and member 18 is shown as flat but may be usable as a heat conductive thermolaminating roller to provide optimum heat transfer at the nipping interface of rollers to provide welding of similar or dissimilar polymers together. It is also noted that the thermoconductive plastic material 10 may be usable as a means for removing heat and providing a heat sink to dissipate heat from one source to another. This thermoconductive elastomeric material 10 provides for heat conductivity to another metallic or thermoplastic material for thermoforming application or operation.

The elastomeric metal material preferably is about seventy five (75) part aluminum powder, about twenty-five parts (25) silicone rubber and about two parts (2) polymerized tetrafluoro ethylene powder. polymerized tetrafluoro ethylene as a powder is shown as two (2) parts and should not be less because it is very desirable that this elastomeric metal material 10 have release properties when polymer materials are in a heated condition. The durometer range of the above mixture can be varied by increasing the silicone rubber content to approximately fifty (50) parts silicone rubber and fifty (50) parts aluminum powder and two (2) parts polymerized tetrafluoro ethylene powder. It is to be especially noted that as the metal powder content is decreased the conductivity is proportionally decreased.

As above noted the preferred mixture of elastomeric metal material may be as little as one sixteenth (1/16") of an inch in thickness but preferably is about one eighth (1/8") of an inch. The maximum thickness is about one half (½") inch. More than this thickness causes problems in conductivity. Thicknesses up to one half inch (½") have been tried and found satisfactory.

The mixture of this invention is used particularly for welding or sealing heated thermoplastic films. Often the films are structured films that contain multiple plies with each ply offering specific properties. This structured film is usually only a few mills in thickness with one surface (the engaging surface) of the heated film sufficiently softened to weld to a like heated surface of a contiguous film. This other heated film may be of a dissimilar polymer but when heat softened is compatible for welding or sealing to the other contiguous film. Many of the structured films have polypropylene as one of the laminating surfaces but other heat softened films may be used and limitations to this polymer are not contemplated. Polymerized tetrafluoro ethylene which is commonly known as Teflon which powder as a portion of the mixture is provided to insure a release agent and so that heat softened film or films do not stick to the surface of the elastomeric mixture. Polymerized tetrafluoro ethylene which is commonly known as Teflon which is a registered Trade Mark of E. I. duPont.

Terms such as "up", "down", "bottom", "top" and the like are applicable to the embodiment illustrating this invention in conjunction with the drawing. These terms are merely for the purpose of description and do not necessarily apply to the position in which the elastomeric compressible metallic mixture may be constructed or used.

While a particular embodiment of this mixture has been described it is to be understood the invention is not limited thereto and protection is sought to the broadest extent the prior art allows.

What is claimed is:

1. An elastomeric compressible mixture having the compressible properties of stiff rubber or rubber-like compounds and having heat transfer characteristics of metal such as aluminum, this mixture for use as a flat sheet or as a roll covering and is disposed in contiguous relationship with a heat conductive metal backup, said mixture including:
    (a) at least two parts polymerized tetrafluoro ethylene powder, and
    (b) the remainder aluminum powder in a range of fifty to seventy-five percent and of rubber or rubber-like materials about forty eight to twenty three percent.

2. A mixture as in claim 1 in which the rubber or rubber-like material is silicone rubber.

3. A mixture as in claim 1 in which the elastomeric material applied to and as a contiguous portion of a backup member is made as a layer from one sixteenth of an inch to a maximum of one half inch in thickness.

4. A mixture as in claim 3 in which the thickness of the elastomeric material is a thickness of about one eighth inch.

5. A mixture as in claim 1 in which the material is two percent polymerized tetrafluoro ethylene powder and is approximately seventy parts aluminum powder and twenty five parts silicone rubber.

* * * * *